(12) United States Patent
Higman

(10) Patent No.: US 9,435,480 B2
(45) Date of Patent: Sep. 6, 2016

(54) CONDUIT REPAIR SYSTEM

(71) Applicant: Rosetta Higman, St. Petersburg, FL (US)

(72) Inventor: Rosetta Higman, St. Petersburg, FL (US)

(*) Notice: Subject to any disclaimer, the term of this patent is extended or adjusted under 35 U.S.C. 154(b) by 0 days.

(21) Appl. No.: 14/858,233

(22) Filed: Sep. 18, 2015

(65) Prior Publication Data

US 2016/0215916 A1 Jul. 28, 2016

Related U.S. Application Data

(63) Continuation-in-part of application No. 14/605,407, filed on Jan. 26, 2015, now Pat. No. 9,163,771.

(51) Int. Cl.
*F16L 55/16* (2006.01)
*F16L 55/179* (2006.01)
*F16L 55/18* (2006.01)
*F16L 55/165* (2006.01)

(52) U.S. Cl.
CPC .......... *F16L 55/179* (2013.01); *F16L 55/1653* (2013.01); *F16L 55/18* (2013.01)

(58) Field of Classification Search
CPC ............. F16L 55/1653; F16L 55/1654; F16L 55/1656; F16L 55/179
USPC ............. 138/98, 97; 156/287; 264/269, 516; 405/150.1, 184.2
See application file for complete search history.

(56) References Cited

U.S. PATENT DOCUMENTS

| | | |
|---|---|---|
| 3,202,562 A | 8/1965 | Lang et al. |
| 3,261,374 A | 7/1966 | Anderson et al. |
| 4,776,370 A | 10/1988 | Long, Jr. |
| 4,880,035 A | 11/1989 | Vetter |
| 4,950,446 A | 8/1990 | Kinumoto et al. |
| 4,985,196 A | 1/1991 | LeDoux et al. |
| 4,995,761 A | 2/1991 | Barton |
| 5,049,003 A | 9/1991 | Barton |
| 5,091,137 A | 2/1992 | LeDoux et al. |
| 5,199,463 A | 4/1993 | Lippiatt |
| 5,203,377 A | 4/1993 | Harrington |
| 5,213,727 A | 5/1993 | Gargiulo |
| 5,265,648 A | 11/1993 | Lyon |
| 5,322,653 A | 6/1994 | Muller |
| 5,346,658 A | 9/1994 | Gargiulo |
| 5,501,248 A | 3/1996 | Kiest, Jr. |
| 5,628,345 A | 5/1997 | Fisco |
| 5,993,114 A * | 11/1999 | Jones .................. F16L 55/1656 405/146 |
| 6,019,136 A | 2/2000 | Walsh et al. |
| 6,360,780 B1 | 3/2002 | Adolphs et al. |
| 7,891,381 B2 | 2/2011 | Anders et al. |
| 7,922,855 B2 | 4/2011 | Harrington |

(Continued)

*Primary Examiner* — Patrick F Brinson
(74) *Attorney, Agent, or Firm* — Larson & Larson, P.A.; Frank Liebenow; Patrick Reid

(57) ABSTRACT

A method and apparatus for repairing a leak in a curved section of plumbing includes a conduit repair liner that has a central section made of polyethylene terephthalate and optionally reinforced to conform to a section of plumbing that has up to a 90 degree bend. The conduit repair liner has straps with an end of each of the straps at an edge and a distal end of each of straps has a section of hook and loop material. The conduit repair liner is wrapped around an inflatable carrier after saturating with a bonding agent then both are positioned within the curved section of the plumbing and the inflatable carrier is inflated. After the bonding agent cures, the inflatable carrier is deflated and removed, leaving the conduit repair liner evenly adhered to the inside surfaces of the curved section of the plumbing.

16 Claims, 6 Drawing Sheets

(56) References Cited

U.S. PATENT DOCUMENTS

| | | |
|---|---|---|
| 8,025,461 B2 | 9/2011 | Kamiyama et al. |
| 8,191,580 B2 | 6/2012 | Scott |
| 2002/0124898 A1 | 9/2002 | Renaud et al. |
| 2010/0212766 A1 | 8/2010 | Kiest, Jr. |
| 2010/0282351 A1 | 11/2010 | Kamiyama et al. |

* cited by examiner

CONDUIT REPAIR SYSTEM

CROSS-REFERENCE TO RELATED APPLICATION

This application is a continuation-in-part of U.S. patent application Ser. No. 14/605,407, filed Jan. 26, 2015, the disclosure of which is hereby incorporated by reference.

FIELD

The invention relates to an improved system and method for rehabilitation of a portion of a structurally damaged or leaking gravity flow system, service line, joint, etc.

BACKGROUND

Ruptures, cracks, and holes often occur in underground conduits such as sanitary sewer lines, storm sewer pipes, and other gravity flow systems and service lines. Repairing these ruptured conduits, from within, is far less expensive and less dangerous than excavating and replacing the damaged sections. One such repair method is to introduce into the conduit a polyester-fiberglass or other structural composite liner impregnated with a thermosetting resin. The liner is wrapped around and secured to an inflatable bladder which is positioned at the rupture and inflated, forcing the repair liner against the inside wall of the conduit. The impregnated composite liner adheres to the damaged inner surface of the conduit and hardens. After completion of the curing process, the bladder is deflated and removed from the conduit. Known related art include U.S. Pat. Nos. 4,995,761 and 5,049,003 to Barton, U.S. Pat. No. 5,628,345 to Fisco, U.S. Pat. No. 5,322,653 to Muller, U.S. Pat. No. 3,202,562 to Lang, et al., U.S. Pat. No. 3,261,374 to Anderson, et al., U.S. Pat. No. 4,776,370 to Long, U.S. Pat. No. 4,880,035 to Vetter, U.S. Pat. No. 4,950,446 to Kinumoto, et al., U.S. Pat. Nos. 4,985,196 and 5,091,137 to LeDoux, et al., U.S. Pat. No. 5,199,463 to Lippiatt, U.S. Pat. No. 5,203,377 to Harrington, U.S. Pat. Nos. 5,213,727 and 5,346,658 to Gargiulo, U.S. Pat. No. 5,265,648 to Lyon, U.S. Pat. No. 5,501,248 to Kiest, et al., and U.S. Pat. No. 6,019,136 to Walsh, et al., the contents of U.S. Pat. No. 6,019,136 are incorporated by reference.

The methods and apparatus, for example, as described in the above cited patents provides for repairs of cracks or leaks in straight sections of pipes, but is less useful for curved sections of pipe, especially curves of 90 degrees or more due to the lack of conformity of the repair liner. Such a repair is often needed in the 90 degree curved section of pipe often found beneath a commode, especially when the commode is situated on a cement slab. Prior repairs often required excavating around the 90 degree section, removal of the damaged 90 degree section, replacement with a new 90 degree section and replacement of the concrete that was removed in the excavation.

What is needed is a system that will repair cracks or leaks in curved sections of pipes without gaining access to the outside surfaces of the pipes (e.g. excavation).

SUMMARY

In one embodiment, a conduit repair system is disclosed including a bonding agent and a conduit repair liner. The conduit repair liner has a mechanism to removably affix the conduit repair liner to a carrier such as straps or other mechanisms. The conduit repair liner is substantially absorbent and soaked in the bonding agent. At least a central section of the conduit repair liner is made of polyethylene terephthalate material so as to be sufficiently resilient as to conform to a section of curved plumbing without forming waves in a surface of the conduit repair liner after the conduit repair liner is inserted into the curved plumbing and the carrier is inflated. In some embodiments, the central section includes a layer of bias-cut reinforcement material.

In another embodiment, a method of repairing a crack or leak in a curved section of plumbing is disclosed including impregnating a conduit repair liner in a bonding agent. The conduit repair liner has straps with an end of each of the straps at an edge of the conduit repair liner and a distal end of each of straps has a section of hook and loop material. At least a central section of the conduit repair liner comprises polyethylene terephthalate material so as to be sufficiently resilient as to conform to a section of curved plumbing. After impregnation is complete, the conduit repair liner is wrapped around an inflatable carrier and then both are positioned within the curved section of the plumbing. Now, the inflatable carrier is inflated such that the conduit repair liner adheres evenly to the inside surfaces of the curved section of the plumbing. Next, the inflatable carrier is deflated and removed, leaving the conduit repair liner evenly conformed and adhered to the inside surfaces of the curved section of the plumbing. In some embodiments, the inflatable carrier is coated with a release agent (e.g., petroleum jelly) to reduce adherence to the conduit repair liner.

In another embodiment, a conduit repair system for repairing a curved section of plumbing is disclosed including a bonding agent and a conduit repair liner. The conduit repair liner has straps for removably affixing the conduit repair liner to a carrier (e.g., an inflatable carrier). The conduit repair liner is absorbent and the central section of the conduit repair liner is made of polyethylene terephthalate material so as to be sufficiently resilient as to conform to a section of plumbing that has a 90 degree bend, thereby conforming to the 90 degree bend of the plumbing without forming waves in a surface. After the conduit repair liner is impregnated with the bonding agent, the conduit repair liner is inserted into the curved section of the plumbing, and the carrier is inflated.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
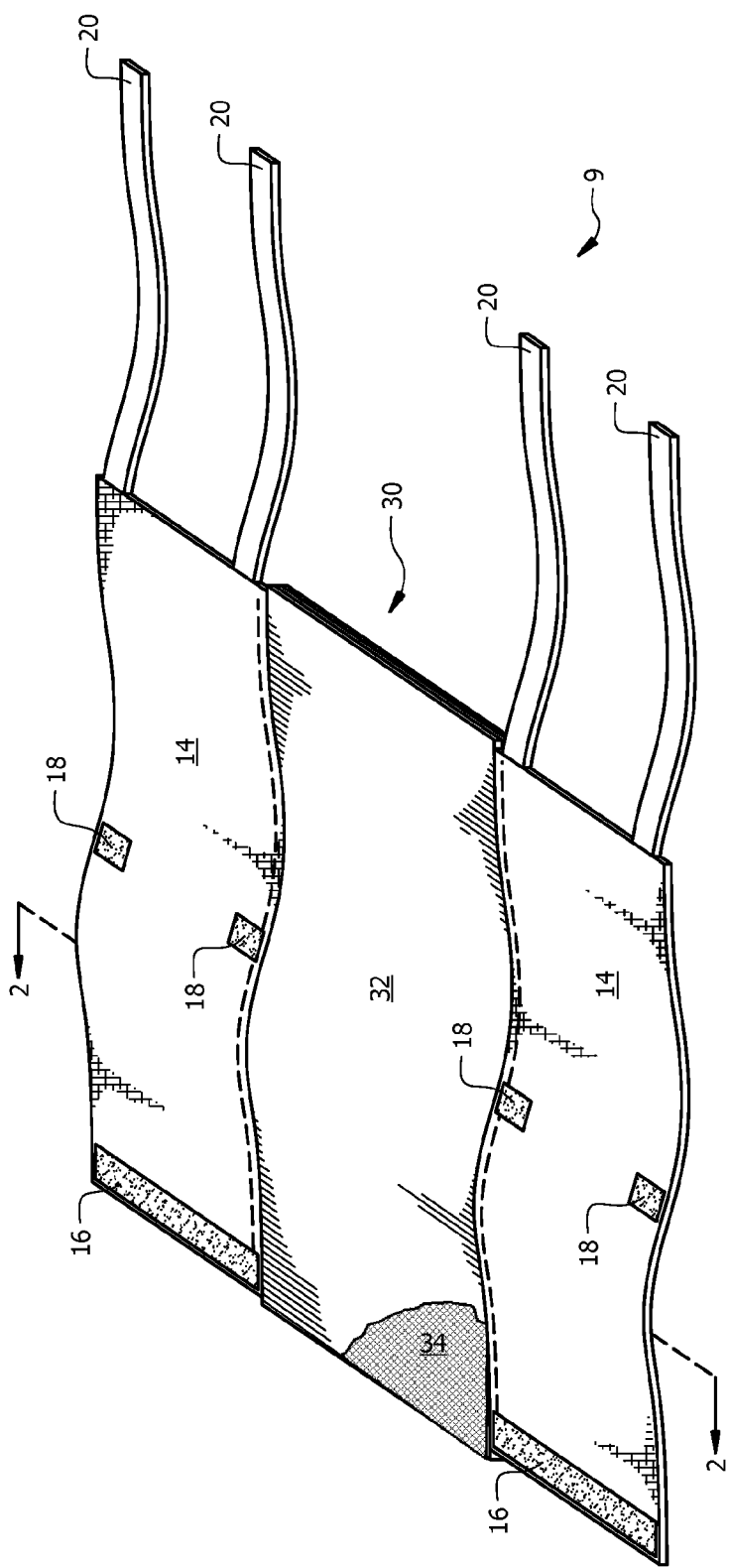
FIG. 1 illustrates a perspective view of a conduit repair system liner.

Reference will now be made in detail to the presently preferred embodiments of the invention, examples of which are illustrated in the accompanying drawings. Throughout the following detailed description, the same reference numerals refer to the same elements in all figures.

In prior repair systems, a felt/fiberglass thread material was saturated in resin (e.g., Epoxy), wrapped around a carrier, then positioned within a straight (e.g., substantially linear) section of plumbing in the area of a leak or crack. Using this material and method did not work for curved sections of plumbing, especially in 90 degree curved sections, as the felt/fiberglass material facing the inside radius of the curved section did not compress significantly, while the felt/fiberglass material facing the outside radius of the curved section did not stretch significantly, resulting in waves/bunching of the felt/fiberglass material facing the inside radius of the curved section and pulling of the felt/fiberglass material facing the outside radius of the curved section. The waves/bunching will lead to a reduced conduit diameter and will lead to potential clogging. The pulling also results in reduced diameter, but additionally, will create air-gaps between the felt/fiberglass material and the curved section of plumbing, resulting in a lack of connection and bonding of the felt/fiberglass material and the curved section with the plumbing.

Figure 2:
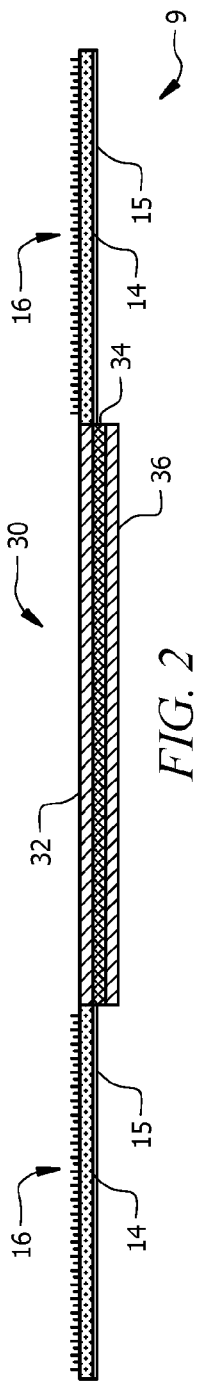
FIG. 2 illustrates a cross-sectional view of the conduit repair system liner.

Referring to FIGS. 1 and 2, views of a conduit repair system is shown. The conduit repair system is used to repair any type of pipe in situ, without requiring excavation around the pipe. Any type of pipe/plumbing is anticipated including PCV pipe, plastic pipe, iron pipe, copper pipe, etc.

The improved conduit repair system shown in FIGS. 1 and 2 overcomes such issues by using a material that stretches in the area of the bend. The conduit repair system includes a conduit repair system liner 9 that is substantially planar and is made of materials that will soak up a bonding agent 90 (e.g., Epoxy resin). This exemplary conduit repair system liner 9 has two end sections 16 and a central section 30. The central section 30 comprises materials that provide for stretching when the central section 30 is positioned in a curved area of plumbing as shown in FIGS. 4A-5C. Although many materials are possible for the central section 30, one preferred material is fleece, with or without a fiberglass bi-axle reinforcement material. Another preferred material for the central section 30 is polyethylene terephthalate, also known as polar fleece, again with or without a fiberglass bi-axle reinforcement material. It is preferred that the reinforcement material be woven and bias cut to provide resiliency needed to conform to bends in the pipe 2 (see FIG. 4A). Generally, woven material has warp and weft threads (horizontal and vertical). Bias cut means that the woven material is cut at an angle of approximately 45 degrees from the warp and weft threads or cut diagonally across the warp and weft threads. Alternately, a chopped fiberglass mat is anticipated. In FIG. 2, an exemplary central section 30 is shown including a layer of a stretchy, absorbent material 32 (e.g., fleece or polar fleece), a reinforcement material 34, and another layer of a stretchy material 36 (e.g., fleece or polar fleece). The optional reinforcement material 34 (e.g., fiberglass bi-axle reinforcement material that is bias-cut) provides additional structural strength and, by being positioned off-axis with respect to the forces of stretching and bias cut, the reinforcement material 34 will stretch with the layers of stretchy, absorbent material 32/36. In some embodiments, the layers of the central section 30 are stitched together, but with a zigzag stitch to allow for stretching and contraction.

Since the end sections 16 are not required to bend, it is anticipated that the end sections be fabricated either of the same material as the central section 30 or be fabricated as previously known using a layer of felt 14 and a layer of tightly woven fiberglass material 15 to provide additional structural strength. In a preferred embodiment, the layer of felt 14 is stitched or sewn to the layer of tightly woven fiberglass material 15, though any attachment mechanism is anticipated including glue and/or adhesives.

To position the conduit repair system liner 9 around a carrier 80 (see FIGS. 3, 4A, 4B, 5A, 5B), one or more retaining straps 20 are provided. As will be shown, after impregnating the conduit repair system liner 9 with a bonding agent 90 (e.g., epoxy resin), the conduit repair system liner 9 is wrapped around a carrier 80 and held to the carrier 80 by attaching the retaining strap(s) 20 to one or more attachment areas 16/18, preferably using hook and loop material or any other temporary attachment mechanism.

Figure 3:
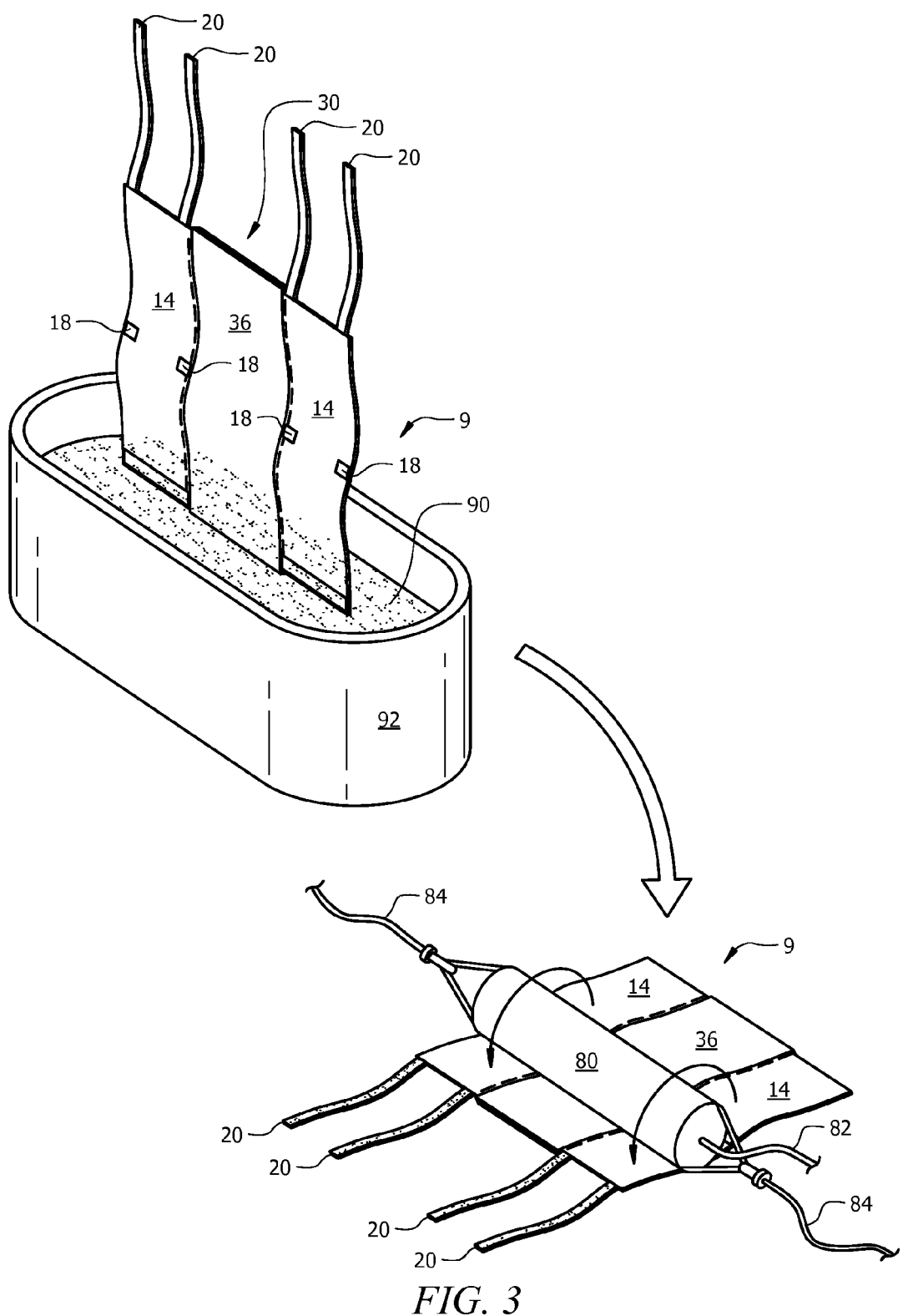
FIG. 3 illustrates a perspective view of the conduit repair system liner being impregnated in resin then wrapped around a deflated carrier.

Referring to FIG. 3 illustrates a perspective view of the conduit repair system liner 9 being soaked in a bonding agent 90 (e.g., epoxy resin) then wrapped around a deflated carrier 80. Although any bonding agent 90 is anticipated, in a preferred embodiment, the bonding agent 90 is resin and, more particularly, epoxy resin. The bonding agent 90 maintains a mechanically bonded connection between the conduit repair system liner 9 and the plumbing 2/4 (see FIGS. 4A-5C) and, after curing, provides structural strength to the repaired plumbing 2/4.

The conduit repair system liner 9 is coated with a bonding agent 90 before installation into a local of failure. In some methods of installation, the bonding agent 90 (e.g., epoxy resin) is poured and spread over the conduit repair system liner 9, substantially covering the conduit repair system liner 9, for example, using a spreader (not shown). In some embodiments, the bonding agent 90 is sprayed onto the conduit repair system liner 9. In FIG. 3, the conduit repair system liner 9 is dipped into a vat 92 of the bonding agent 90, allowing the end sections 16 and the central section 30 to adequately absorb the bonding agent 90. The conduit repair system liner 9 coated with the bonding agent 90 is then wrapped around a carrier 80 and secured using the one or more retaining straps 20 that are affixed to one or more attachment areas 16/18, thereby temporarily holding the conduit repair system liner 9 to the carrier 80. By whatever mechanism used, it is preferred that the conduit repair system liner 9 be substantially covered and saturated in bonding agent 90.

The carrier 80 preferably includes positioning mechanisms 84 for moving the carrier 80 within the plumbing 2/4 and an inflation tube 82, which will be explained. The positioning mechanisms are any device used to properly position the carrier 80 at the local of failure, including, but not limited to ropes, cables, push rods, etc. The method of installation of the conduit repair system liner 9 using the carrier 80 is described with FIGS. 4A-5C, though it is fully anticipated that the conduit repair system liner 9 be used with other types of carrier systems and using other methods that may or may not use a carrier 80.

Figure 4A:
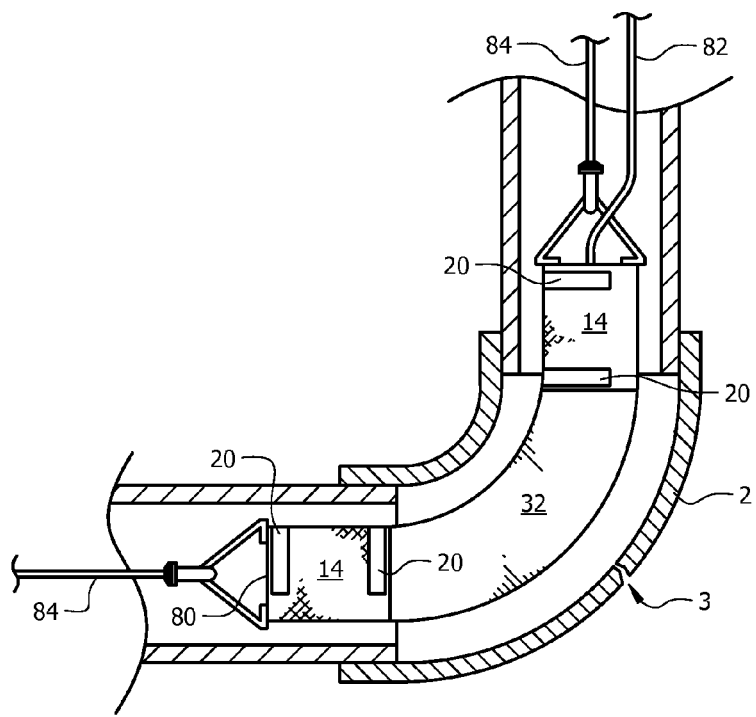
FIG. 4A illustrates a cross-sectional view of the conduit repair system liner wrapped around a deflated carrier and pulled into place within a 90 degree curve of a conduit.
Figure 4B:
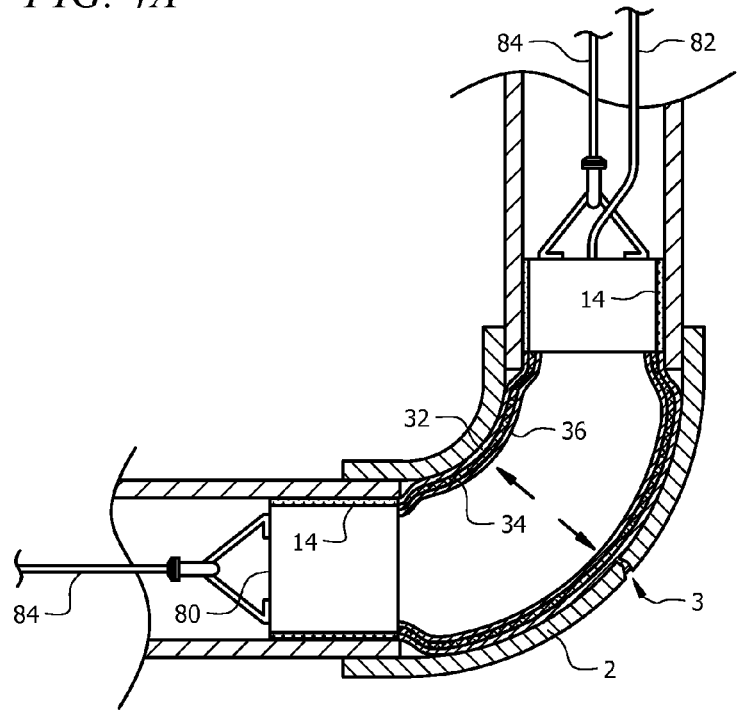
FIG. 4B illustrates a cross-sectional view of the conduit repair system liner wrapped around a now inflated carrier in place within the 90 degree curve of a conduit.
Figure 4C:
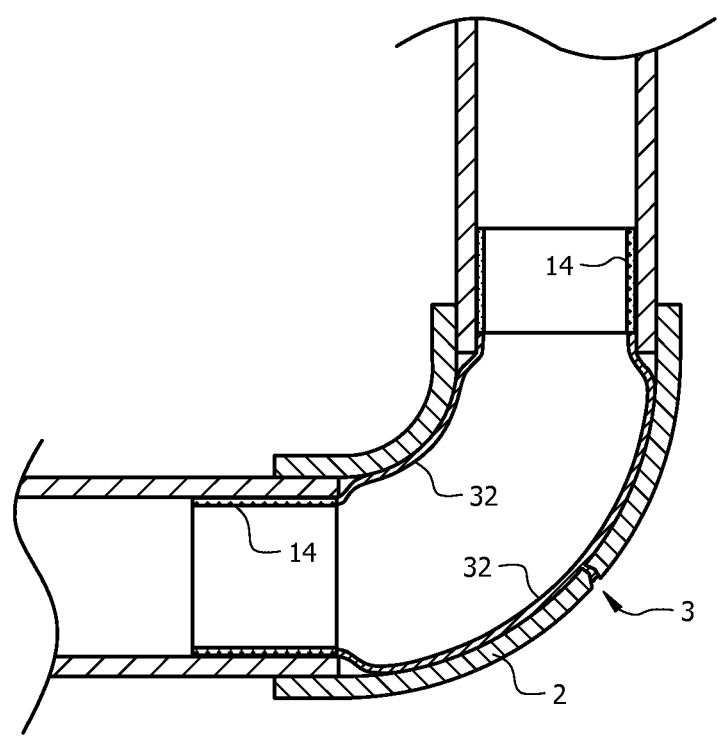
FIG. 4C illustrates a cross-sectional view of the conduit repair system liner in place within the 90 degree curve of a conduit, after the carrier has been deflated and removed.

Referring to FIGS. 4A-4C, views of the conduit repair system liner 9 during installation within a 90 degree curve of a conduit 2. After the conduit repair system liner 9 is wrapped around the carrier 80, the conduit repair system liner 9 and the carrier 80 are positioned within the plumbing 2 as shown in FIG. 4A, by, for example, pulling/pushing using the positioning lines 84. Note, that the method shown of positioning the conduit repair system liner 9 and the carrier 80 are examples as it is anticipated that the conduit repair system liner 9 functions with other methods of positioning, all of which are included here within. Note that there is a crack or leak 3 in the plumbing 2.

Once the conduit repair system liner 9 and the carrier 80 are in position, the inflatable carrier 80 is inflated (see FIG. 4B) through the inflation tube 82, expanding the conduit repair system liner 9 and forcing the conduit repair system liner 9 to stretch and contact the inside surface of the plumbing 2. By making the central section 30 from a stretchable material such as fleece or polar fleece, the conduit repair system liner 9 at the smaller radius area of the plumbing 2 compresses without wrinkling while the conduit repair system liner 9 at the larger radius area of the plumbing 2 stretches without creating a gap between the conduit repair system liner 9 and the inside wall of the plumbing 2 (at the larger radius). Therefore, substantially the entire conduit repair system liner 9 (soaked with the bonding agent 90) rests against the inner walls of the plumbing 2 in the area of the crack/leak 3. Now, the carrier 80 is deflated (or evacuated if necessary) and pulled out of the repair area of the pipe 2, leaving the conduit repair system liner 9 affixed to the inside walls of the plumbing 2 as shown in FIG. 4C. Once the bonding agent 90 cures, the plumbing 2 has similar or superior structural support, as required by, for example, plumbing beneath roadways, etc.

Figure 5A:
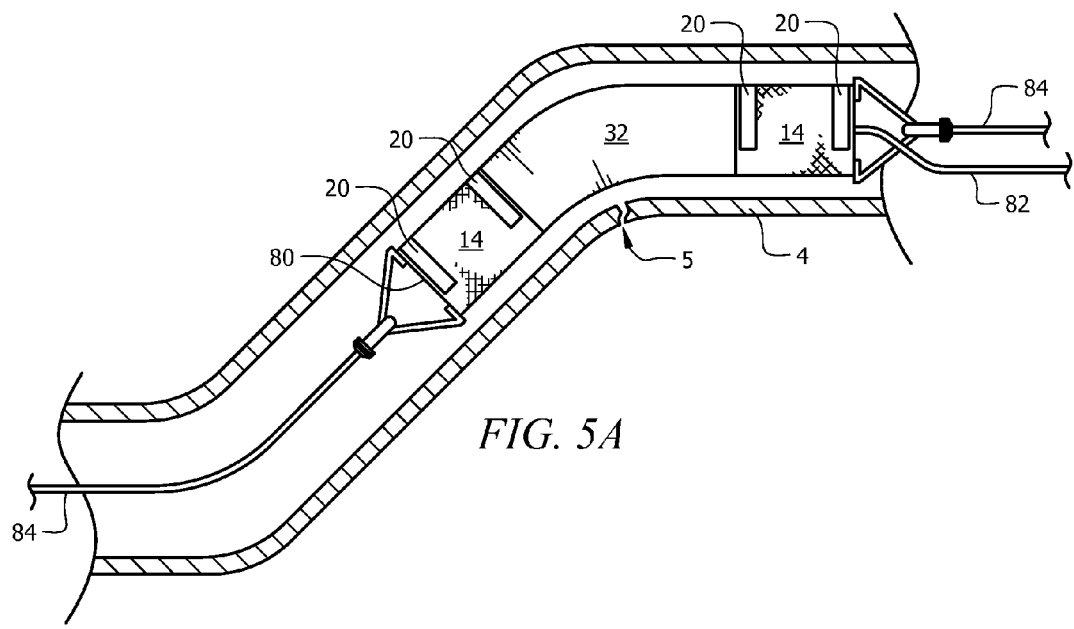
FIG. 5A illustrates a cross-sectional view of the conduit repair system liner wrapped around a deflated carrier and pulled into place within a curve of a conduit that bends less than 90 degrees.
Figure 5B:
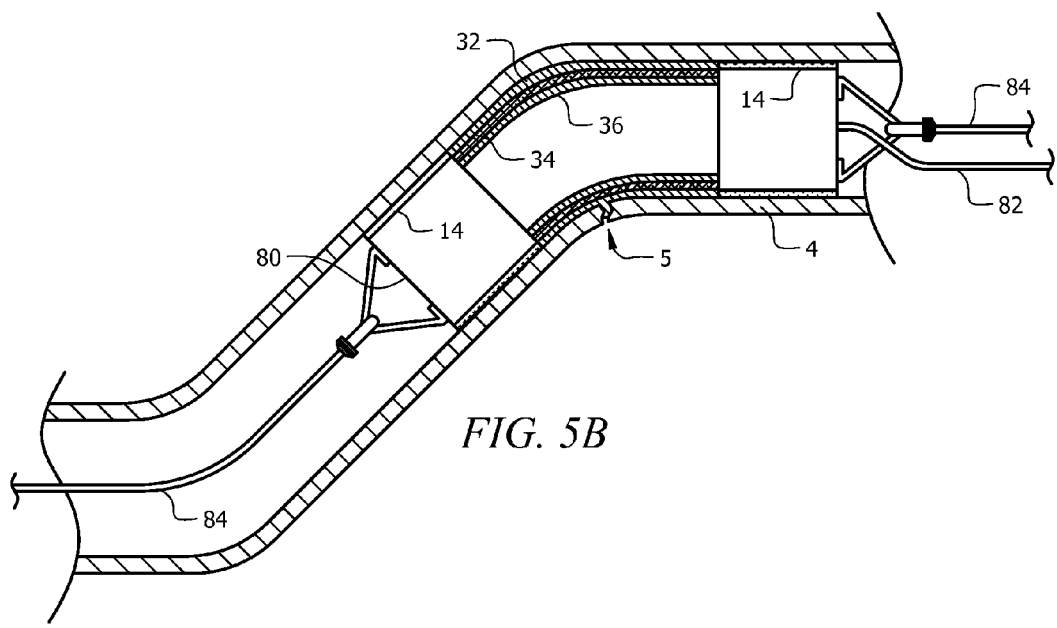
FIG. 5B illustrates a cross-sectional view of the conduit repair system liner wrapped around a now inflated carrier in place within a curve of a conduit that bends less than 90 degrees.
Figure 5C:
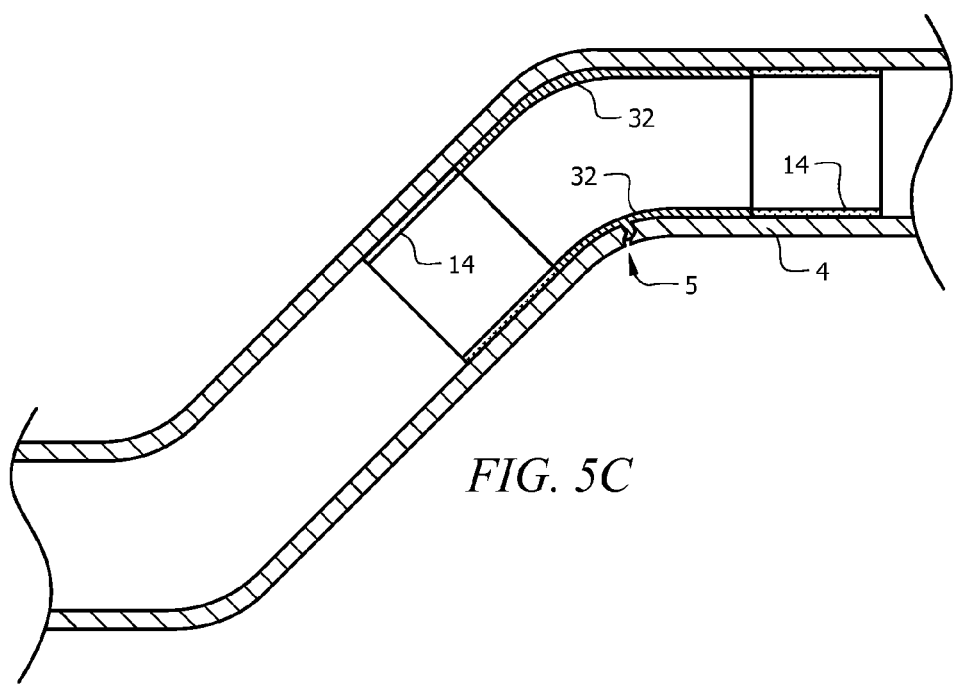
FIG. 5C illustrates a cross-sectional view of the conduit repair system liner in place within a curve of a conduit that bends less than 90 degrees, after the carrier has been deflated and removed.

Referring to FIGS. 5A-5C, view of the conduit repair system liner 9 during installation within a curve of a conduit 4 that bends less than 90 degrees. After the conduit repair system liner 9 is wrapped around the carrier 80, the conduit repair system liner 9 and the carrier 80 are positioned within the plumbing 4 as shown in FIG. 5A, by, for example, pulling/pushing using the positioning lines 84. Note, that the method shown of positioning the conduit repair system liner 9 and the carrier 80 are examples as it is anticipated that the conduit repair system liner 9 functions with other methods of positioning, all of which are included here within. Note that there is a crack or leak 5 in the plumbing 4.

Once the conduit repair system liner 9 and the carrier 80 are in position, the carrier 80 is inflated (see FIG. 5B) through the inflation tube 82, expanding the conduit repair system liner 9 and forcing the conduit repair system liner 9 to stretch and contact the inside surface of the plumbing 4. By making the central section 30 from a stretchable material such as fleece or polar fleece, the conduit repair system liner 9 at the smaller radius area of the plumbing 4 compresses without wrinkling while the conduit repair system liner 9 at the larger radius area of the plumbing 4 stretches without creating a gap between the conduit repair system liner 9 and the inside wall of the plumbing 4 (at the larger radius). Therefore, substantially the entire conduit repair system liner 9 (soaked with the bonding agent 90) rests against the inner walls of the plumbing 4 in the area of the crack/leak 5. Now, the carrier 80 is deflated (or evacuated if necessary) and pulled out of the repair area of the pipe 4, leaving the conduit repair system liner 9 affixed to the inside walls of the plumbing 4 as shown in FIG. 5C, where curing bonds the conduit repair system liner 9 affixed to the inside walls of the plumbing 4.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A conduit repair system comprising:
a bonding agent; and
a conduit repair liner having means for removably affixing to a carrier, surfaces of the conduit repair liner are absorbent and are coated with the bonding agent, at least a central section of the conduit repair liner comprises polyethylene terephthalate so as to be sufficiently resilient as to conform to a section of curved plumbing without forming waves in the surfaces of the conduit repair liner after the conduit repair liner is inserted into the curved plumbing and the carrier is inflated;
wherein the central section of the conduit repair liner comprises an outer layer of the polyethylene terephthalate that is adjacent to a middle layer of reinforcement material that is bias-cut, that being adjacent to an inner layer of the polyethylene terephthalate.

2. The conduit repair system of claim 1, wherein section of curved plumbing bends at 90 degrees.

3. The conduit repair system of claim 1, wherein the bonding agent is a resin.

4. The conduit repair system of claim 3, wherein the resin is epoxy.

5. The conduit repair system of claim 1, wherein the central section of the conduit repair liner is made of a two layers of polyethylene terephthalate surrounding a layer of bias-cut reinforcement material.

6. The conduit repair system of claim 1, wherein the conduit repair liner further comprises two end sections and each of the end sections comprises a layer of felt stitched to a layer of woven fiberglass, the woven fiberglass being bias-cut.

7. The conduit repair system of claim 1, wherein the means for removably affixing to the carrier is a plurality of straps, an end of each of the straps affixed to an edge of the conduit repair liner and a distal end of each of the plurality of straps has a section of hook and loop material that mates to a corresponding section of hook and loop material that is affixed to one of the surfaces of the conduit repair liner.

8. A method of repairing a crack or leak in a curved section of plumbing, the method comprising:
substantially coating a conduit repair liner with a bonding agent, the conduit repair liner having plurality of straps, an end of each of the straps at an edge of the conduit repair liner and a distal end of each of the plurality of straps has a section of hook and loop material, a central section of the conduit repair liner is sufficiently resilient as to conform to a section of curved plumbing and the central section of the conduit repair liner comprises an outer layer of the polyethylene terephthalate that is adjacent to a middle layer of reinforcement material that is bias-cut, that being adjacent to an inner layer of the polyethylene terephthalate;

after coating, wrapping the conduit repair liner around an inflatable carrier, engaging the hook and loop material to corresponding hook and loop material on a surface of the conduit repair liner;

positioning the inflatable carrier and conduit repair liner within the curved section of the plumbing;

inflating the inflatable carrier such that the bonding agent abuts the inside surfaces of the curved section of the plumbing;

deflating the inflatable carrier; and removing the inflatable carrier, leaving the conduit repair liner and bonding agent affixed to the inside surfaces of the curved section of the plumbing.

9. The method of claim 8, wherein the curved section of the plumbing bends at 90 degrees.

10. The method of claim 8, wherein the bonding agent is epoxy.

11. The method of claim 8, further comprising: the bonding agent at least partially filling the crack or the leak in the curved section of the plumbing.

12. The method of claim 8, wherein the conduit repair liner further comprises two end sections and each of the end sections comprises a layer of felt stitched to a layer of woven fiberglass.

13. A conduit repair system for repairing a curved section of plumbing, the conduit repair system comprising:

a bonding agent; and a conduit repair liner having straps for removably affixing the conduit repair liner to a carrier, the conduit repair liner being absorbent and at least a central section of the conduit repair liner comprises polyethylene terephthalate so as to be sufficiently resilient as to conform to a section of plumbing that has a 90 degree bend, thereby conforming to the 90 degree bend of the plumbing without forming waves in a surface of the central section of the conduit repair liner after the conduit repair liner is inserted into the curved section of the plumbing and the carrier is inflated, the conduit repair liner being at least partially coated with the bonding agent;

wherein the central section of the conduit repair liner further comprises a layer of bias-cut woven fiberglass bi-axle reinforcement material that is sandwiched between two layers of the polyethylene terephthalate.

14. The conduit repair system of claim 13, wherein the conduit repair liner further comprises two end sections and each of the end sections comprises a layer of felt stitched to a layer of woven fiberglass.

15. The conduit repair system of claim 13, wherein the an end of each of the straps is affixed to an edge of the conduit repair liner and a distal end of each of the of the straps has a section of hook and loop material that mates with and removably holds to a corresponding section of hook and loop material that is affixed to a surface of the conduit repair liner that meets with an inside surface of the curved section of the plumbing.

16. The conduit repair system of claim 13, wherein the carrier is inflatable for forcing the conduit repair liner against an inside surface of the curved section of the plumbing and deflatable for later removal from the plumbing after the conduit repair liner bonds to the inside surface of the curved section of the plumbing.

* * * * *